United States Patent [19]

Kirkman

[11] Patent Number: 4,784,239

[45] Date of Patent: Nov. 15, 1988

[54] LIGHTWEIGHT OPEN FRAME TREE STAND

[76] Inventor: Obie L. Kirkman, 457 Highway 55, Cove City, N.C. 28523

[21] Appl. No.: 149,165

[22] Filed: Jan. 27, 1988

[51] Int. Cl.[4] ........................ A45F 3/26; A01M 31/02

[52] U.S. Cl. ...................................... 182/187; 108/152

[58] Field of Search ................. 182/187, 188; 108/152

[56] References Cited

U.S. PATENT DOCUMENTS

| | | | |
|---|---|---|---|
| 2,982,337 | 5/1961 | Arena | 182/187 |
| 3,358,789 | 12/1967 | Laun | 182/187 |
| 3,493,080 | 2/1970 | Ehlert | 182/187 |
| 4,069,891 | 1/1978 | McClung | 182/187 |
| 4,411,335 | 10/1983 | Forrester | 182/187 |
| 4,730,699 | 3/1988 | Threlkeld | 182/187 |

*Primary Examiner*—Reinaldo P. Machado

*Attorney, Agent, or Firm*—Rhodes, Coats & Bennett

[57] ABSTRACT

The present invention entails a tree mounted deer stand that is of a lightweight open frame construction. In particular, the deer stand comprises a tree trunk mounting frame and an open base frame structure extending generally normally therefrom. Extending upwardly from a central part of the open base frame is a seat support post having a rotating seat mounted thereon. A circumferential portion of the open base frame structure forms a foot bar that enables a seated hunter to propel and reposition himself or herself by pushing against the foot bar with his or her feet, while leaving the hunter's hands totally free for operating a firearm.

13 Claims, 2 Drawing Sheets

18
12
22
16
10
40
14
36
34
32
20
28
32
30

LIGHTWEIGHT OPEN FRAME TREE STAND

FIELD OF INVENTION

The present invention relates to tree stands, and more particularly to a lightweight open frame tree stand designed to be mounted within a tree.

BACKGROUND OF THE INVENTION

Deer hunting is very popular outdoor sport. It is appreciated that over the years, deer hunters have typically climbed trees and sat on limbs while watching for deer. Obviously, the task of climbing a tree and finding a position in the tree to sit is not an easy task, not to mention the discomfort of sitting in a tree for a long period of time. Because of this, deer hunters in the past have used what is commonly referred to as a tree stand. Typically, these comprise a portable chair that the hunter anchors adjacent a tree trunk at a selected height. Once the tree stand is secured to the trunk of the tree, the hunter assumes a position on the seat of the tree stand and from that vantage point can view a substantial area around the tree supporting the tree stand.

While tree stands have been quite popular, they have their drawbacks and disadvantages which have discouraged many hunters from using them. Principally, among the disadvantages and drawbacks is the fact that most tree stands are heavy and very ungainful. One must keep in mind that the tree stand has to be elevated and mounted in a tree. With some tree stands it becomes a major endeavor to elevate the stand upwardly adjacent the tree and hold the stand at a certain elevation while it is being secured to the tree.

Beyond that many tree stands are designed such that the hunter is quite confined while occupying the stand and does not have a great deal of maneuverability. For example, in many tree stand designs, the seat is directly adjacent the tree trunk and consequently the hunter's movement is confined and that naturally restricts the hunter's ability to see in all directions around the tree.

Therefore, there has been and continues to be a need for a tree stand that is of a lightweight construction and which is easy to handle and which, when mounted in a tree, enables the hunter to easily maneuver himself or herself around so as to be able to span the entire area surrounding the tree.

SUMMARY AND OBJECTS OF THE INVENTION

The present invention entails a tree stand of the type adapted to be mounted within a tree. The tree stand of the present invention is of an open lightweight frame construction and comprises a tree trunk mounting frame and a base frame extending from the mounting frame in cantilever fashion. A foot bar extends around the base frame and a swivel seat structure is centrally supported over the base frame and spaced outwardly from the adjacent tree trunk. A hunter occupying the swivel seat can rotate himself or herself around on the seat structure by pushing against the foot bar with his or her feet. This obviously frees the hunter's hands for complete attention to a firearm.

It is therefore an object of the present invention to provide a tree stand of the type adapted to be mounted within a tree that is of a lightweight construction.

Another object of the present invention resides in the provision of a tree stand that is easy to handle and carry and which is easy to mount within a tree.

It is also an object of the present invention to provide a tree stand with a swivel seat that is so designed and spaced so as to support the hunter in an unconfined environment.

Still a further object of the present invention resides in the provision of a tree stand of the character referred to above that includes an encompassing foot bar that extends outwardly around the swivel seat that permits the hunter to rotate the seat by simply pushing against the foot bar with his or her feet.

Another object of the present invention resides in the provision of a tree stand that is of an open frame structure and which includes an outwardly extending open frame base that is supported in cantilever fashion.

Another object of the present invention resides in the provision of a tree stand of the character referred to above that is structurally sound and very durable.

Still a further object of the present invention resides in the provision of a tree stand of the character referred to above that is relatively simple in design and which can be easily manufactured.

Another object of the present invention resides in the provision of a tree stand of the character referred to above that is relatively inexpensive.

Another object of the present invention resides in the provision of a tree stand that is easily attachable to a tree.

A further object of the present invention resides in the provision of a tree stand of the character referred to above that is comfortable and which can turn 360 degrees.

Another object of the present invention resides in the provision of a tree stand of the character referred to above that is designed with a foot bar that disposes the hunter's knees in a desirable position that gives the hunter a good prop for shooting.

Other objects and advantages of the present invention will become apparent and obvious from a study of the following description and the accompanying drawings which are merely illustrative of such invention.

DETAILED DESCRIPTION OF THE INVENTION

Figure 1:
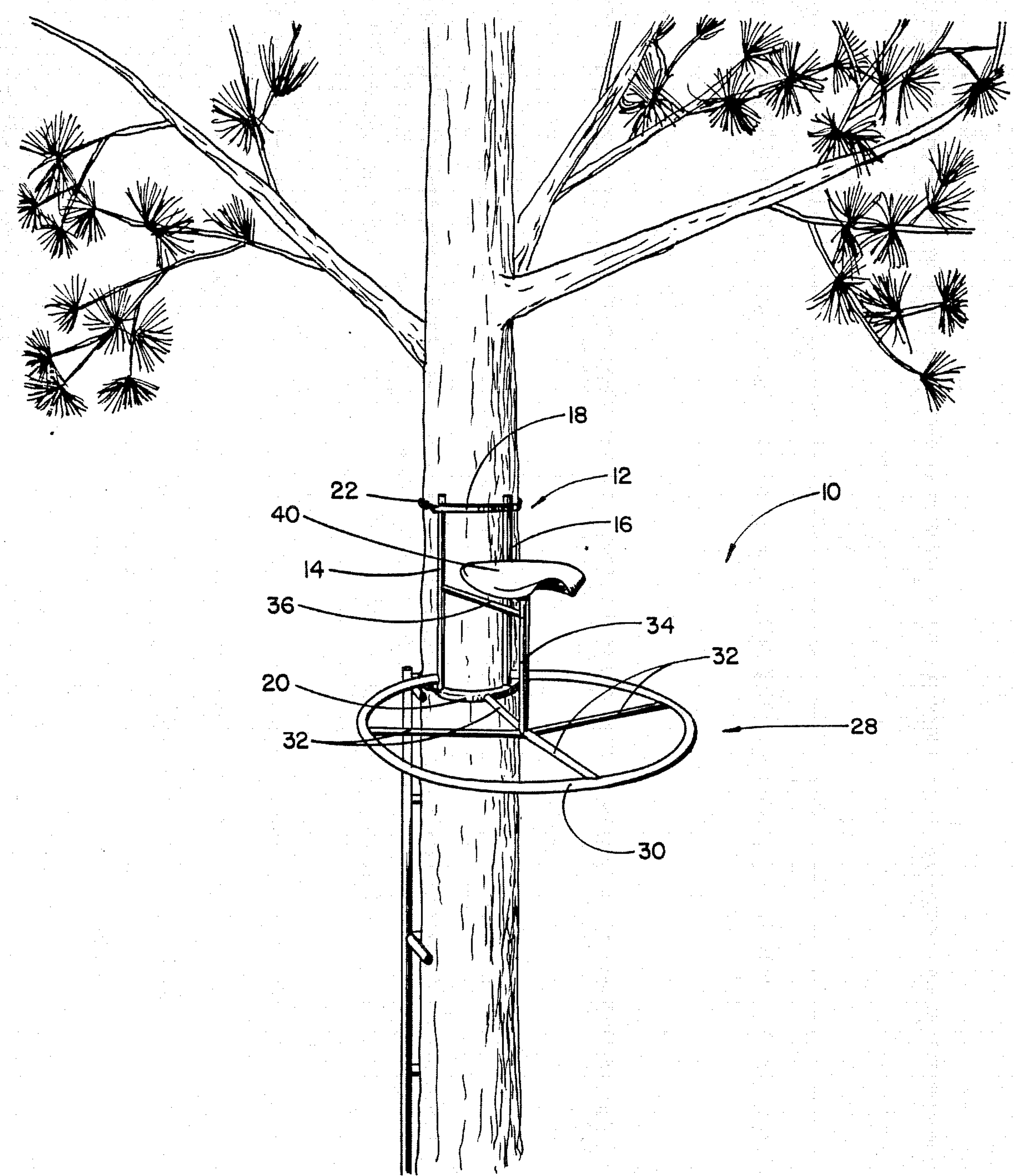
FIG. 1 is a perspective view of the tree stand of the present invention mounted to a tree trunk.

With further reference to the drawings, the tree stand of the present invention is shown therein and indicated generally by the numeral 10. In FIG. 1, tree stand 10 is shown mounted to the trunk of a tree.

Viewing tree stand 10 in more detail it is seen that the same comprises a mounting frame 12 that is designed to enable the tree stand 10 to be secured directly adjacent a tree trunk. Mounting frame 12 includes a pair of laterally spaced vertical members 14 and 16. Interconnected between vertical members 14 and 16 is a pair of arcuate shaped horizontal members 18 and 20. It is appreciated that the arcuate shape of horizontal members 18 and 20 enable the mounting frame 12 to rest directly adjacent the tree trunk as the arcuate shape tends to conform to the shape of the tree trunk.

For securing mounting frame 12 directly to the tree trunk, there is provided a pair of chains 22 and 24 that are secured directly to the frame 12. About opposite sides of the frame structure 12 there is provided a pair of eye hooks 26 for receiving the chains 22 and 24. Therefore, it is seen that by wrapping chains 22 and 24 around the tree trunk and securing them to the eye hooks 26 of the frame 12, that the entire deer stand 10 can be appropriately secured at an elevated height onto the tree trunk.

Secured to mounting frame 12 and extending therefrom in cantilever fashion is an open base frame 28. Base frame 28 includes a circular foot bar 30 that extends outwardly from the mounting frame 12 and which encompasses a substantial area. Note that foot bar 30 includes a relatively small open section that actually receives mounting frame 12. The open section being referred to is defined by opposed ends 30*a* and 30*b* of the foot bar 30.

Secured to foot bar 30 and extending inwardly therefrom is a series of generally equally spaced radial spoke members 32. The outer ends of the radial members 32 are secured to foot bar 30 by weldment or other suitable means. Each radial member 32 includes an inner end that terminates about a center seat support point.

Figure 2:
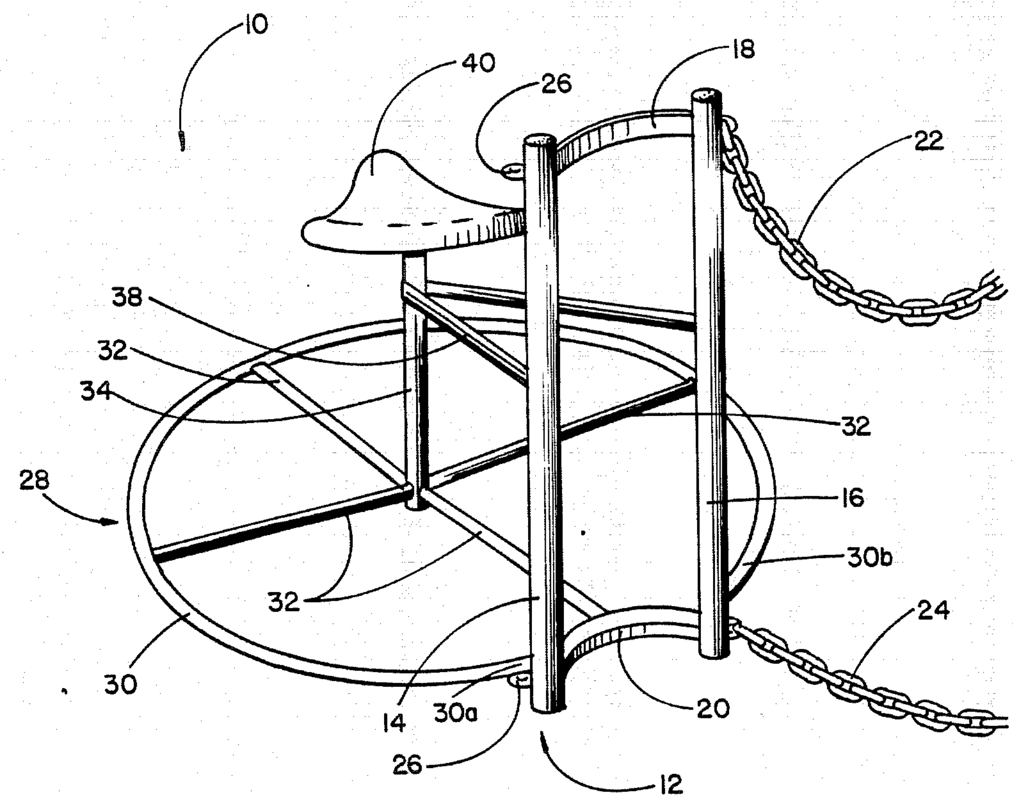
FIG. 2 is a second perspective view of the tree stand of the present invention.

As particularly shown in FIG. 2, a vertical seat support post 34 is connected to the inner ends of radial members 32. The vertical seat support post 34 extends upwardly therefrom and includes an upper terminal end that receives a swivel or rotatable seat 40. To stablize post 34 there is provided a pair of V-shaped lateral reinforcing members 36 and 38 that extend between the mounting frame 12 and seat support post 34.

As seen in the drawings, the swivel or rotatable seat 40 is spaced above foot bar 30 and inwardly thereof. However, swivel seat 40 is particularly positioned with respect to foot bar 30 so as to allow a hunter occupying the swivel seat 40 to reach the foot bar 30 with his or her feet. By particularly spacing the swivel seat 40 to accomplish this, enables the hunter to pivot and turn the seat by simply using his or her feet, thereby leaving the hunter's hands completely free to handle and aim a firearm.

As seen in the drawings, the tree stand 10 of the present invention presents a design that places the hunter in a non-confined and unencumbered environment. The hunter can easily turn and rotate and view a very substantial area in and around the tree supporting the tree stand 10. Because of the cantilever design, the hunter is disposed or positioned substantially outwardly from the tree. This assures that the hunter occupying swivel seat 40 is not interfered with by the adjacent standing tree and that the overall interference by the tree will be minimal.

Because of the open frame construction, the tree stand 10 of the present invention is of a relatively lightweight and can be easily handled and mounted within a tree. It is appreciated that the tree stand 10 of the present invention can be constructed of various suitable materials such as aluminum as well as other types of metals or plastics.

Once a hunter is stationed on the tree stand 10 of the present invention and occupying swivel or rotatable seat 40, it is appreciated that the hunter can extend his legs to where his or her feet rest on the circular foot bar 30. With the hunter's hands holding the firearm, the hunter can rotate himself or herself about the axis of the post 34 by pushing his or her feet against the foot bar 30. In fact, as seen in the drawings, it is appreciated that the hunter can rotate about an arc or area that is almost 360 degrees. This enables the hunter to maintain a continuous lookout over a very substantial area surrounding the tree supporting the deer stand 10. In addition, the design enables the hunter to maintain his or her hands free and on a firearm at all times thereby greatly decreasing the response time once desirable game has been spotted.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tree stand comprising:

(a) a tree trunk mounting frame for engaging a tree trunk and including at least two flexible tie members connected to the mounting frame and extending therefrom for wrapping around a portion of the tree trunk so as to secure the mounting frame to the tree trunk;

(b) a circular foot bar secured to the mounting frame and extending outwardly therefrom in a plane that lies generally perpendicular to the axis of the tree trunk when the tree stand is appropriately mounted to such;

(c) the circular foot bar including an open section that defines two opposed ends, and wherein the mounting frame is connected to the two opposed ends of the foot bar;

(d) a series of generally equally spaced radial bars secured to the foot bar and extending inwardly therefrom to where they meet to form a central seat support point;

(e) a vertical seat support post extending upwardly from the central seat support point;

(f) lateral support means interconnected between the frame and the seat support post for stabilizing the seat support post; and (g) a swivel seat mounted to the seat support post above the radial bar and spaced relatively close to the circular foot bar such that a hunter sitting in the seat may use his or her feet to engage the foot bar and by pushing the foot bar can rotate himself or herself about the axis of the seat support post in order that a direct view may be had of substantially the entire area surrounding the mounted tree stand.

2. The tree stand of claim 1 wherein the mounting frame comprises a pair of laterally spaced vertical members and a pair of vertically spaced arcuately shaped horizontal members interconnected between the two vertical members.

3. The tree stand of claim 2 wherein the flexible tie members comprise a pair of chains that are connected to the mounting frame.

4. The tree stand of claim 1 wherein the vertical seat support post extends into the plane of the foot bar and wherein the respective radial bars connect to the vertical seat support posts and extend outwardly therefrom to where they connect with the foot bar.

5. The tree stand of claim 1 wherein the lateral support means comprises a pair of interconnecting members that connect at one end to the seat support post and at the opposite ends to the mounting frame.

6. A relatively lightweight open frame type tree mounted tree stand comprising:

(a) a mounting frame structure for attaching the tree stand to the trunk of a tree;

(b) an open frame secured to the mounting frame and extending outwardly therefrom in cantilever fashion, the open base frame disposed in a plane that extends generally perpendicular to the mounting frame;

(c) the open base frame including an outer foot bar that extends around and encompasses a substantial area, and wherein the foot bar includes an open section that defines two opposed ends and wherein the two opposed ends of the foot bar are connected to the mounting frame structure;

(d) an intermediate open frame structure extending inwardly from the foot bar and defining a seat support point inwardly of the foot bar;

(e) post means secured to the intermediate frame structure at the seat support point and extending upwardly therefrom;

(f) a swivel seat mounted on the post means and spaced above the intermediate from structure; and (g) the swivel seat being spaced inwardly of the foot bar but sufficiently close to the foot bar in order to allow a hunter sitting in the swivel seat to push against the foot bar with his or her feet in order to propel the seat towards and to a particular position without requiring the assistance of the hunter's hands, thereby freeing the hunter's hands from any positioning task and allowing the hunter to hold his or her firearm at all times while watching for game.

7. The tree stand of claim 6 wherein the foot bar actually connects to the mounting frame structure.

8. The tree stand of claim 6 wherein said mounting frame structure includes a pair of laterally spaced vertical members that are interconnected by a pair of arcuately shaped horizontal members; and wherein the two opposed ends of the foot bar are connected to the vertical members of the mounting frame structure.

9. The tree stand of claim 6 wherein said foot bar is circular in configuration and wherein the intermediate frame structure includes a plurality of equally spaced radial spoke members secured to the circular foot bar and extending inwardly therefrom to a seat support point.

10. The tree stand of claim 9 wherein the post means comprises a vertical post secured to the radial spoke member at the seat support point and wherein the post extends upwardly therefrom and includes an upper terminal end that receives and supports the swivel seat.

11. A lightweight tree stand that permits hands-free positioning of a rotatable seat comprising:

(a) a circular foot bar that extends around and encompasses a substantial area and includes an open section that defines two opposed ends;

(b) a tree trunk mounting frame mounted in the open section of the foot bar and including a pair of vertical members and a pair of horizontal members interconnected between the vertical members;

(c) flexible tie members secured to the mounting frame for securing the mounting frame and the tree stand to the trunk of a tree;

(d) a series of generally equally spaced radial members secured about one end to the foot bar and extending inwardly therefrom to where inner ends of the radial members terminate in the vicinity of a center point defined relative to the foot bar;

(e) a seat support post having upper and lower end portions with the lower end portion secured to the inner ends of the respective radial members and wherein the seat support post extends upwardly therefrom; and (f) a rotating seat mounted to the upper end portion of the seat support post and rotatable thereabout, the rotating seat being spaced above the radial members and inwardly of the foot bar but sufficiently close to the foot bar to allow a hunter occupying the rotating seat to use his or her feet to propel and reposition the seat while maintaining his or hands on a firearm at all times.

12. The tree stand of claim 11 further including lateral support means interconnecting the seat support post and the mounting frame.

13. The tree stand of claim 12 wherein the lateral support means comprises a V-shaped interconnecting structure that includes a pair of rods secured to the seat support post and which extend outwardly and radially from the seat support post to where they connect to the mounting frame

* * * * *